United States Patent
Shah et al.

(10) Patent No.: US 8,650,066 B2
(45) Date of Patent: Feb. 11, 2014

(54) SYSTEM AND METHOD FOR UPDATING PRODUCT PRICING AND ADVERTISING BIDS

(75) Inventors: Niraj Shah, Boston, MA (US); Steven Conine, Boston, MA (US)

(73) Assignee: CSN Stores, Inc., Boston, MA (US)

( * ) Notice: Subject to any disclaimer, the term of this patent is extended or adjusted under 35 U.S.C. 154(b) by 1889 days.

(21) Appl. No.: 11/507,025

(22) Filed: Aug. 21, 2006

(65) Prior Publication Data

US 2008/0046316 A1 Feb. 21, 2008

(51) Int. Cl.
*G06Q 30/00* (2012.01)

(52) U.S. Cl.
USPC ............... 705/7.35; 705/14.41; 705/14.42; 705/14.43

(58) Field of Classification Search
USPC ............ 705/7.35, 14.41, 14.42, 14.43, 14.69
See application file for complete search history.

(56) References Cited

U.S. PATENT DOCUMENTS

| | | | |
|---|---|---|---|
| 6,094,641 | A | 7/2000 | Ouimet et al. |
| 6,553,352 | B2 | 4/2003 | Delurgio et al. |
| 6,851,604 | B2 | 2/2005 | Girotto et al. |
| 2001/0051932 | A1 | 12/2001 | Srinivasan et al. |
| 2002/0069134 | A1 | 6/2002 | Solomon |
| 2002/0116348 | A1 | 8/2002 | Phillips et al. |
| 2002/0165834 | A1 | 11/2002 | Delurgio et al. |
| 2003/0110072 | A1 | 6/2003 | Delurgio et al. |
| 2003/0115121 | A1* | 6/2003 | Bremner et al. ............... 705/35 |
| 2003/0177103 | A1 | 9/2003 | Ivanov et al. |
| 2005/0021440 | A1 | 1/2005 | Dresden |
| 2005/0071249 | A1 | 3/2005 | Nix et al. |
| 2005/0125364 | A1 | 6/2005 | Edmondson et al. |
| 2005/0149396 | A1 | 7/2005 | Horowitz et al. |
| 2005/0149397 | A1 | 7/2005 | Morgenstern et al. |
| 2005/0256778 | A1 | 11/2005 | Boyd et al. |
| 2007/0028263 | A1* | 2/2007 | Collins ........................ 725/34 |
| 2007/0130090 | A1* | 6/2007 | Staib et al. .................. 705/400 |
| 2007/0143186 | A1* | 6/2007 | Apple et al. .................. 705/14 |

OTHER PUBLICATIONS

Montgomery, A.L. "Applying Quantitative Marketing Techniques to the Internet" Interfaces, vol. 31, No. 2, pp. 90-108, Mar.-Apr. 2001.
Ahtiala, P., "Content, Advertising, and Circulation in an Optimizing Model of the Media Firm", Tampere Economic Working Papers Net Series, Working Paper 25, Dec. 2003.

(Continued)

*Primary Examiner* — Yehdega Retta
(74) *Attorney, Agent, or Firm* — Alston & Bird LLP

(57) ABSTRACT

A system and method maximize profits by determining the optimal combination of sale price for a product and bids for advertising. The system and method address the non-linear relationship between product pricing and advertising through an advertising bidding system. In particular, a seller sells a product at a plurality of sale prices and buys the at least one advertisement by submitting a plurality of bid prices to the at least one advertising venue, resulting in a combination of bid prices for the at least one advertisement at each of the plurality of sale prices. Data from advertising with each of the at least one advertisement is collected. Then, a non-linear model for pricing and bidding is determined from the collected data, and an optimal price for the product and an optimal advertising bid for each of the at least one advertisement is determined from the non-linear model.

47 Claims, 4 Drawing Sheets

(56) References Cited

OTHER PUBLICATIONS

"Right Media Connects Web Publishers to the First Dynamic Pricing Platform Open to All Advertising Networks", PRNewswire, Apr. 13, 2005.

Miller, W.D., "Price as a Strategic Business Tool: 10 Lessons Bankers Can Learn from Retailers", BAI Banking Strategies, pp. 1-8, Jul./Aug. 2005.

"Mexicana de Aviacion Licenses the PROS O&D Revenue Management Solution", Business Wire, Nov. 28, 2005.

\* cited by examiner

Advertisement 1 of 1 at Advertisement Venue 202

| | Product Sales Price A | Direct Product Costs B | Margin Per Unit C | Max Ad Bid D | Avg. Actual Cost Per Click E | Generated Traffic F | Conversion Rate G | Quantity Sold H | Margin Dollars I | Ad Cost J | Margin (After Ad Cost) K |
|---|---|---|---|---|---|---|---|---|---|---|---|
| Scenario 206 | $80 | $75 | $5 | $0.15 | $0.10 | 250 | 3.00% | 7.5 | $37.50 | $25.00 | $12.50 |
| Scenario 208 | $80 | $75 | $5 | $0.15 | $0.10 | 200 | 3.00% | 6 | $30.00 | $20.00 | $10.00 |
| Scenario 210 | $80 | $75 | $5 | $0.20 | $0.20 | 500 | 3.00% | 15 | $75.00 | $100.00 | -$25.00 |
| Scenario 212 | $80 | $75 | $5 | $0.20 | $0.20 | 500 | 3.00% | 15 | $75.00 | $100.00 | -$25.00 |
| Scenario 214 | $80 | $75 | $5 | $0.35 | $0.30 | 900 | 3.00% | 27 | $135.00 | $270.00 | -$135.00 |
| Scenario 216 | $80 | $75 | $5 | $0.35 | $0.30 | 1,000 | 3.00% | 30 | $150.00 | $300.00 | -$150.00 |
| Scenario 218 | $90 | $75 | $15 | $0.15 | $0.11 | 200 | 2.00% | 4 | $60.00 | $22.00 | $38.00 |
| Scenario 220 | $90 | $75 | $15 | $0.15 | $0.11 | 250 | 2.00% | 5 | $75.00 | $27.50 | $47.50 |
| Scenario 222 | $90 | $75 | $15 | $0.20 | $0.23 | 450 | 2.00% | 9 | $135.00 | $103.50 | $31.50 |
| Scenario 224 | $90 | $75 | $15 | $0.20 | $0.23 | 500 | 2.00% | 10 | $150.00 | $115.00 | $35.00 |
| Scenario 226 | $90 | $75 | $15 | $0.35 | $0.30 | 1,000 | 2.50% | 25 | $375.00 | $300.00 | $75.00 |
| Scenario 228 | $90 | $75 | $15 | $0.35 | $0.30 | 800 | 2.50% | 20 | $300.00 | $240.00 | $60.00 |
| Scenario 230 | $100 | $75 | $25 | $0.15 | $0.11 | 250 | 1.00% | 2.5 | $62.50 | $27.50 | $35.00 |
| Scenario 232 | $100 | $75 | $25 | $0.15 | $0.11 | 200 | 1.00% | 2 | $50.00 | $22.00 | $28.00 |
| Scenario 234 | $100 | $75 | $25 | $0.20 | $0.20 | 500 | 1.20% | 6 | $150.00 | $100.00 | $50.00 |
| Scenario 236 | $100 | $75 | $25 | $0.20 | $0.20 | 500 | 1.20% | 6 | $150.00 | $100.00 | $50.00 |
| Scenario 238 | $100 | $75 | $25 | $0.35 | $0.29 | 1,000 | 1.30% | 13 | $325.00 | $290.00 | $35.00 |
| Scenario 240 | $100 | $75 | $25 | $0.35 | $0.29 | 1,000 | 1.30% | 13 | $325.00 | $290.00 | $35.00 |

Advertisement 1 of 1 at Advertisement Venue 204

| | Product Sales Price A | Direct Product Costs B | Margin Per Unit C | Max Ad Bid D | Avg. Actual Cost Per Click E | Generated Traffic F | Conversion Rate G | Quantity Sold H | Margin Dollars I | Ad Cost J | Margin (After Ad Cost) K | Total Margin (After Ad Costs) L |
|---|---|---|---|---|---|---|---|---|---|---|---|---|
| Scenario 206 | $80 | $75 | $5 | $0.20 | $0.14 | 400 | 2.00% | 8 | $40.00 | $56.00 | -$16.00 | -$3.50 |
| Scenario 208 | $80 | $75 | $5 | $0.40 | $0.27 | 1,000 | 3.00% | 30 | $150.00 | $270.00 | -$120.00 | -$110.00 |
| Scenario 210 | $80 | $75 | $5 | $0.20 | $0.14 | 405 | 2.00% | 8.1 | $40.50 | $56.70 | -$16.20 | -$41.20 |
| Scenario 212 | $80 | $75 | $5 | $0.40 | $0.27 | 1,100 | 3.00% | 33 | $165.00 | $297.00 | -$132.00 | -$157.00 |
| Scenario 214 | $80 | $75 | $5 | $0.20 | $0.14 | 420 | 2.00% | 8.4 | $42.00 | $58.80 | -$16.80 | -$151.80 |
| Scenario 216 | $80 | $75 | $5 | $0.40 | $0.27 | 950 | 3.00% | 28.5 | $142.50 | $256.50 | -$114.00 | -$264.00 |
| Scenario 218 | $90 | $75 | $15 | $0.20 | $0.14 | 390 | 1.00% | 3.9 | $58.50 | $54.60 | $3.90 | $41.90 |
| Scenario 220 | $90 | $75 | $15 | $0.40 | $0.25 | 1,020 | 2.00% | 20.4 | $306.00 | $255.00 | $51.00 | $98.50 |
| Scenario 222 | $90 | $75 | $15 | $0.20 | $0.14 | 410 | 1.00% | 4.1 | $61.50 | $57.40 | $4.10 | $35.60 |
| Scenario 224 | $90 | $75 | $15 | $0.40 | $0.25 | 1,000 | 2.00% | 20 | $300.00 | $250.00 | $50.00 | $85.00 |
| Scenario 226 | $90 | $75 | $15 | $0.20 | $0.14 | 420 | 1.00% | 4.2 | $63.00 | $58.80 | $4.20 | $79.20 |
| Scenario 228 | $90 | $75 | $15 | $0.40 | $0.25 | 1,040 | 2.00% | 20.8 | $312.00 | $260.00 | $52.00 | $112.00 |
| Scenario 230 | $100 | $75 | $25 | $0.20 | $0.18 | 395 | 0.50% | 1.975 | $49.38 | $71.10 | -$21.73 | $13.28 |
| Scenario 232 | $100 | $75 | $25 | $0.40 | $0.25 | 980 | 1.50% | 14.7 | $367.50 | $245.00 | $122.50 | $150.50 |
| Scenario 234 | $100 | $75 | $25 | $0.20 | $0.18 | 425 | 0.50% | 2.125 | $53.13 | $76.50 | -$23.38 | $26.63 |
| Scenario 236 | $100 | $75 | $25 | $0.40 | $0.25 | 1,000 | 1.50% | 15 | $375.00 | $250.00 | $125.00 | $175.00 |
| Scenario 238 | $100 | $75 | $25 | $0.20 | $0.18 | 410 | 0.50% | 2.05 | $51.25 | $73.80 | -$22.55 | $12.45 |
| Scenario 240 | $100 | $75 | $25 | $0.40 | $0.25 | 1,080 | 1.50% | 16.2 | $405.00 | $270.00 | $135.00 | $170.00 |

FIGURE 2

Data Distributor 114

Data Set 302

| | Product Sales Price | Direct Product Costs | Margin Per Unit | Max Ad Bid | Avg. Actual Cost Per Click | Generated Traffic | Quantity Sold | % Quanity Sold | Margin Dollars | Ad Cost | Margin (After Ad Cost) |
|---|---|---|---|---|---|---|---|---|---|---|---|
| | A | B | C | D | E | F | G | H | I | J | K |
| Scenario 308 | $80 | $75 | $5 | $0.15 | $0.10 | 250 | 8 | 11.3% | $40.00 | $25.00 | $15.00 |
| Scenario 310 | $80 | $75 | $5 | $0.15 | $0.10 | 200 | 6 | 8.5% | $30.00 | $20.00 | $10.00 |
| Scenario 312 | $80 | $75 | $5 | $0.20 | $0.20 | 500 | 15 | 21.1% | $75.00 | $100.00 | -$25.00 |
| Scenario 314 | $80 | $75 | $5 | $0.20 | $0.20 | 500 | 15 | 21.1% | $75.00 | $100.00 | -$25.00 |
| Scenario 316 | $80 | $75 | $5 | $0.35 | $0.30 | 900 | 27 | 38.0% | $135.00 | $270.00 | -$135.00 |

Data Set 304

| | Product Sales Price | Direct Product Costs | Margin Per Unit | Max Ad Bid | Avg. Actual Cost Per Click | Generated Traffic | Quantity Sold | % Quanity Sold | Margin Dollars | Ad Cost | Margin (After Ad Cost) |
|---|---|---|---|---|---|---|---|---|---|---|---|
| | A | B | C | D | E | F | G | H | I | J | K |
| Scenario 318 | $80 | $75 | $5 | N/A | N/A | 600 | 18 | 100.00% | $90.00 | N/A | N/A |

Data Set 306

| | Product Sales Price | Direct Product Costs | Margin Per Unit | Max Ad Bid | Avg. Actual Cost Per Click | Generated Traffic | Quantity Sold | % Quanity Sold | Total Quantity Sold | Margin Dollars | Ad Cost | Margin (After Ad Cost) |
|---|---|---|---|---|---|---|---|---|---|---|---|---|
| | AA | BB | CC | DD | EE | FF | GG | HH | II | JJ | KK | LL |
| Scenario 320 | $80 | $75 | $5 | $0.15 | $0.10 | 250 | 8 | 2.03 | 10.03 | $50.14 | $25.00 | $25.14 |
| Scenario 322 | $80 | $75 | $5 | $0.15 | $0.10 | 200 | 6 | 1.52 | 7.52 | $37.61 | $20.00 | $17.61 |
| Scenario 324 | $80 | $75 | $5 | $0.20 | $0.20 | 500 | 15 | 3.80 | 18.80 | $94.01 | $100.00 | -$5.99 |
| Scenario 326 | $80 | $75 | $5 | $0.20 | $0.20 | 500 | 15 | 3.80 | 18.80 | $94.01 | $100.00 | -$5.99 |
| Scenario 328 | $80 | $75 | $5 | $0.35 | $0.30 | 900 | 27 | 6.85 | 33.85 | $169.23 | $270.00 | -$100.77 |

FIGURE 3

SYSTEM AND METHOD FOR UPDATING PRODUCT PRICING AND ADVERTISING BIDS

BACKGROUND OF THE INVENTION

1. Field of the Invention

The present invention generally relates to determining the optimal pricing and advertising expenditure for a seller's goods and services, and more particularly to a system and method for determining the optimal prices and optimal advertising bids for a seller's goods and services based on an interdependence between price elasticity of demand and advertising through an advertising bidding system.

2. Description of the Related Art

Over the course of the past decade, the expansion of the Internet has been accompanied by the rise of electronic commerce (e-commerce). As the number of e-commerce websites on the Internet has increased and the popularity of this commercial medium has grown more commonplace, the need for sellers to be able to quickly, accurately, and efficiently acquire and process information about the markets they serve has increased considerably. As used herein, a seller may refer to a retailer, distributor, manufacturer, or any individual, group, or entity selling a product. Moreover, a product may refer to any good or service.

Determining an optimal price for a product is one of the most important tasks for a seller, because pricing is central to consumer interest and marketing efforts. When pricing products, a seller must take into account all of the fixed and variable costs that it incurs while selling the product. These fixed or variable costs may include, but are not limited to, the wholesale price of the product or the cost of production, freight charges, and other related direct or indirect business operating costs and overhead. To ensure that the seller garners a profit, the seller must price the product at some value higher than the total cost of selling the product. The seller loses money if the product is not priced to cover the total cost of selling the product.

The total cost of selling the product, however, is usually not the only factor in determining the price of a product. A very important factor is the effect that a change in price has on the demand for the product. This effect is known as price elasticity. A seller must usually consider the number of units of the product that the entire market of buyers is willing to buy at a particular price. This number of units is known as the quantity demanded. In most cases, the quantity demanded for a product is inversely related to the price of the product. Thus, as the price of a product decreases, the quantity demanded usually increases. Conversely, as the price of a product increases, the quantity demanded usually decreases.

In some cases, demand for a product may change significantly with the slightest change in price. In other cases, the demand may experience insignificant change with a change in price. This sensitivity of the quantity demanded for a product in response to a change in its price is known as the price elasticity of demand.

A price for a product may be elastic, unit elastic, or inelastic. If the product price is elastic, the quantity demanded is very sensitive to changes in price. In this case, the seller must be cautious when adjusting the price, as the quantity demanded can fluctuate drastically with even a slight change in price.

If the product's price is unit elastic, the quantity demanded changes proportionality with a change in price. In this case, as the price changes the quantity demanded changes but in close relation to the price change.

However, in some cases, the price of a product may be inelastic. In other words, the quantity demanded is not sensitive to changes in price, and, generally speaking, consumers demand the same amount of the product at any price. In this case, as the price changes the quantity demanded is unlikely to change in a significant way.

Accordingly, in order to maximize the total sales for a particular product, a seller must take into account the price elasticity of the product, and therefore price the product according to the relationship between price and demand. While this allows a seller to maximize the total monetary value of sales, it may not allow for the maximization of profit.

In order to develop any significant demand for its product, a seller must generally advertise its products and make the public aware of its goods. However, the cost of advertising must be deducted from the gross sales, along with other direct product costs, in order to determine profit. As such, a seller must consider the cost of advertising when determining the optimal price at which to sell a product in order to maximize profits. Thus, when a seller spends more money on advertising, it increases the demand, and therefore revenue, for a product, but the seller's costs also increase as advertisement expenditures increase.

Various advertising venues are available for sellers to promote consumer knowledge about their goods and services. An advertising venue is any medium by which information about goods or services can be communicated. Traditional advertising venues include print media, radio, television, telephone marketing, and public displays. However, the growth of the Internet as a medium for disseminating information has given sellers new types of advertising venues. Such advertising venues may direct the Internet users to a seller's own Internet website.

Advertising venues on the Internet price advertisements in various ways. The two most common pricing methods are to charge on either a Cost Per Impression (CPI) basis or a Cost Per Click (CPC) basis.

Common forms of CPI advertisements are banner ads, link exchanges, and pop-up advertisements. A banner advertisement is a graphic image, that appears on an Internet website, most frequently at the top of the page, designed to persuade users to click on the advertisement, which then directs them via a hyperlink to the advertiser's website. A link exchange employs an advertising practice in which a first website features a graphical or text hyperlink to a second website, in exchange for money and/or an agreement by the second, or other, website to feature a graphical or text hyperlink to the first website. A pop-up advertisement is a window that displays an advertisement within, or over, a website. People are exposed to these types of advertisements without any special action, because they automatically either appear in the body of a webpage, as is the case with banner advertisements and link exchanges, or on their computer screens, as is the case with pop-up advertisements. CPI advertisements are billed to the advertiser on a fixed value based on the number of people exposed to the advertisement, a system similar to the rate methods used in print media. Some CPI advertisements also have varying pricing schemes based upon the size and prominence of the advertisement, e.g. where larger or more prominent advertisements cost more than smaller or less visible advertisements. Although there may be a hyperlink to a seller's own website in the CPI advertisement, the advertising cost does not depend on whether the user actually clicks on the hyperlink.

Most CPC advertisements are based upon keyword searches in search engines. A keyword is a word, or series of words that, when entered into a search engine by a user, triggers corresponding advertisements to appear. A seller typically uses a word or words that relate to the products for sale in order to attract potential customers. A search engine searches a database of web pages for the keyword(s) and typically presents a list of web pages associated with the keyword(s). The web pages on the list are ranked, or ordered, according to relevancy, which may vary according to different search engines. In addition to displaying these search results on these pages, often advertisements are shown alongside the standard search results. These advertisements are often identified as such by appearing on a certain area of the page, or having a textual or graphical indicator. However this may not always be the case, and the advertisements may be intermingled with the standard search results, with no indicator that they are in fact advertisements. As described below, the ranking of the advertisements, in some cases, can also depend on the amount the advertiser pays for its advertisement to appear in the results. For example, a user may enter the keywords "TV stand" through an online search engine, whereby the search engine generates a results page that showcases advertisements that are associated with the keywords "TV stand." In order for a seller to have its advertisement appear on the search results page associated with a keyword or keywords, it must pay the search engine a predetermined fee, every time a user clicks on its advertisement.

There are two primary types of CPC systems, straight-auction bidding systems and blind-bid systems.

In straight-auction bidding systems employed by companies like Overture™, also known as Yahoo Search Solutions™, a seller wishing to advertise chooses the keyword(s) on which it wishes to bid, and then determines the maximum amount of money it is willing to pay each time someone who searches the keyword(s) clicks on its advertisement. An advertiser is able to see every bid in the system placed by other advertisers and can bid accordingly. These systems typically charge the advertiser an amount equal to one cent above the next highest bidder's bid for each time the advertiser's advertisement is clicked. Thus, the actual cost for each click on the advertisement may be less than the bid.

In addition to straight-auction style online advertisement bidding systems, there are also more complex systems such as the blind-bid style auctions employed by Google AdWords™. In the blind-bid style system used by Google™, a web seller wishing to advertise chooses a keyword that relates to the product it is trying to sell, and informs Google™ of the maximum amount of money it is willing to pay each time someone clicks on the direct link to its website. In such blind-bid CPC systems, an advertiser is not able to see how much other advertisers are paying to have their websites featured. Moreover, some CPC systems do not rank advertisers solely on their maximum advertisement bid. For instance, Google™ ranks search results based on a number of factors, such as click-through-rate and the seller's maximum advertisement bid. The click-through-rate is a percentage calculated by dividing the number of times an advertisement is clicked on by the number of times the advertisement is shown to users. The rank assigned to an advertisement at a search engine is significant because most online advertising systems are designed so that the advertiser who is willing to bid the highest has its advertisement shown the most frequently and/or the most prominently. While this increases that advertiser's cost, it is often the case that the advertisement that is featured the most frequently and prominently obtains the most prospective buyers, and most likely also the most orders.

A seller is not limited to advertising at one advertising venue, or one type of venue. In fact, it is generally beneficial for the seller to advertise through different types of advertising venues simultaneously. In order to manage a successful advertising strategy, the seller must collect data that allows it to assess the effectiveness of its advertisements in each advertising venue. For instance, a seller who posts an advertisement through an Internet advertising venue that has a hyperlink to the seller's website is interested in the click-through-rate and conversion rate for the advertisement. Conversion rate indicates the percentage of consumers who actually make a purchase after accessing the seller's website through the hyperlink. Click-through-rates and conversion rates are highly important as they provide a gauge by which the seller can determine how effective an advertisement is at generating web traffic and at generating product sales.

As described previously, a seller must be able to determine what combination of product price and advertising expense generates the most profit dollars. Product pricing must be higher than the total cost to sell, which includes the applicable advertising costs. While advertising expenditures increase total costs, they also create demand. Separately, demand is also tied to product pricing. Thus, finding the optimal profit point is very difficult since the interaction between product pricing and advertising expense can be non-linear and often unpredictable.

Optimizing product pricing and advertising expenditures is made complex when using an advertising strategy that employs a variety of advertising venues. Conventional systems do not track and organize advertising data for sellers who have complex advertising strategies that use different advertising venues at the same time.

Moreover, optimization is made even more complex when these advertising venues have a non-linear effect on the demand they generate. Conventional systems only create models that assume a linear relationship between advertising costs and resulting sales, as seen with print media which generally charge standard or fixed fees based on the level of circulation. A linear advertising model expresses advertising expenditures and resulting margin in terms of a proportional relationship. In other words, a change in advertising creates a proportional change in the amount of demand generated. For example, if a seller spends $10 to advertise a product and it results in $100 in profit, a linear advertising model predicts that if the seller doubles advertising expenditures to $20, profit also doubles to $200. Conversely, if the seller cuts advertising expenditures in half, margin is also expected to decrease by the same percentage.

Linear-based demand advertising models are generally sufficient for traditional advertising venues. However, they are not sufficient for analyzing data in the complex area of Internet advertising. In particular, the bidding systems used in Internet advertising create a non-linear relationship between advertising expenditure and the demand and profit that result. These bidding systems are also dynamic, and have constantly changing advertising rates associated with them. As a result linear models are insufficient for optimizing price and advertising expenditures when a seller advertises through one or more Internet advertising venues that use bidding systems to set the advertising rates.

SUMMARY OF THE INVENTION

In order to address the shortcomings of the conventional systems described above, the present invention provides a system and method for maximizing profits by determining the optimal combination of sale price for a product and bids for advertising. In particular, the present invention addresses the non-linear relationship between product pricing and advertising through an advertising bidding system.

Accordingly, exemplary embodiments of the present invention provide a system and method for maximizing profits from the sale of a product by a seller to consumers through a seller venue, where the product is advertised with at least one advertisement provided by at least one advertising venue. The seller sells the product at a plurality of sale prices and buys advertisements by submitting a plurality of bid prices to the advertising venues, resulting in a combination of bid prices for the advertisements at each of the plurality of sale prices. During a collection period, data from advertising with each of the advertisements is collected. A non-linear model for pricing and bidding is determined from the collected data. An optimal price for the product and an optimal advertising bid for each of the at least one advertisement is determined from the non-linear model.

In particular, an embodiment of the system may include a seller venue, a logging engine, and an optimization engine. The seller venue presents information about a product to consumers, who are directed to the seller venue by at least one advertisement. During a collection period, the logging engine collects data from advertising with each advertisement. Meanwhile, the optimization engine determines, from the collected data, a non-linear model for pricing and bidding. Furthermore, the optimization engine determines, from the non-linear model, an optimal price for the product and an optimal advertising bid for each of the advertisements. The logging engine may collect data on all activity whether or not the consumers are traceable to a particular advertisement, and as a result, the system may further include a data distributor for aggregating the data collected for the untraceable consumers with the data collected for the traceable consumers. Moreover, the system may include a product database that stores a current sale price for the product and supplies the current sale price for the sale of the product to consumers, where a product repricing trigger updates the product database with the optimal price for the product determined by the optimization engine. In addition, the system may include: an advertisement database for storing bid prices for buying advertisements; an advertisement spending trigger for updating the bid prices in the advertisement database with the optimal bid prices determined by the optimization engine; and a bid management engine for submitting the bid prices from the advertisement database to the advertising venues.

Further embodiments of the present invention provide a system and method which iteratively determines an optimal product price for a combination of bid prices for the advertisements. A starting price is set for the product. During a first collection period with the product priced according to the starting price data from advertising with each advertisement is collected. A lower price for the product is set, where the lower price is less than the starting price by a decrement amount. During a second period with the product priced according to the lower price, data from advertising with each of the advertisements is collected. A higher price for the product is also set, where the higher price is greater than the starting price by an increment amount. During a third collection period with the product priced according to the higher price, data from advertising with each of the advertisements. From the starting price, the lower price, and the higher price, a profit-maximizing price is determined according to the data collected during the first, second, and third collection periods. If the profit-maximizing price is not equal to the starting price, the steps above are repeated with the profit-maximizing step as a new starting price until the iterations determine the optimal product price for the advertising bids. This iterative approach can be used for each of a plurality of sets of advertising bids to identify the optimal combination of product price and advertising bids. In this way, the space mapping the relationship between product price and advertising bids can be determined. Conversely, in an alternative embodiment, the product price can initially be kept constant as an optimal combination of advertising bids is determined for the particular product price by iteratively evaluating a series of combinations of advertising bids. The optimal combination of advertising bids can than be found for a plurality of product prices.

As used herein, the term seller refers to any person, organization, or entity that sells any good or service. A seller may be, but is not limited to, a commercial retailer, distributor, manufacturer, or private seller, whether or not the sale of goods or services occurs primarily through a website on the Internet. Although the embodiments of the present invention described herein may refer to web sellers in particular, the present invention is not limited to sellers who conduct business on the web. For instance, it is applicable to any seller who employs any advertising bidding system, whether or not the bidding occurs over an electronic network.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

FIG. 2 illustrates a table with example data used by the system shown in FIG. 1.

FIG. 3 illustrates a table with example data processed by the data distributor shown in FIG. 1.

DETAILED DESCRIPTION

It has been discovered that conventional systems are incapable of determining the optimal prices and optimal advertising bids for a seller's goods and services due to the interdependence between price elasticity of demand and advertising through an advertising bidding system. In particular, it has been discovered that conventional systems do not address the non-linear relationship between product pricing and advertising through an advertising bidding system.

When attempting to maximize profit, a seller must take into account the relationship between price elasticity of demand and associated advertising expenditures. Related advertising expenditures must be considered because the amount that a seller spends on advertising directly affects the number of sale prospects delivered and the number of orders generated in a manner which is not generally linear. Advertising, at one or more venues, increases the seller's sales, but it also increases costs. While the increase in sales and the resulting profit may be greater than the related advertising expenditures, this may not always be the case. As such, one must evaluate various scenarios to determine the optimal combination of price and advertising. Generally speaking, the more money a seller spends at an advertising venue, the more prominently the seller's advertisements are displayed; and consequently, the seller experiences an increase in sales. However, while spending more money improves the placement of the advertisement and increases sales, it also causes an increase in advertisement costs, and the resulting profit margin may or may not increase.

Accordingly, the present invention provides a system and method for maximizing profits by determining the optimal combination of sale price for a product and bids for advertising. Moreover, the present invention determines this optimal combination even when the seller advertises through a plurality of different advertising venues, or advertisement providers, where different expenditures can be made with different bids at each advertising venue for a given sale price for the product.

The data outlined in the examples described herein is purposefully simplified in order to provide a clear understanding of the present invention.

Figure 1:
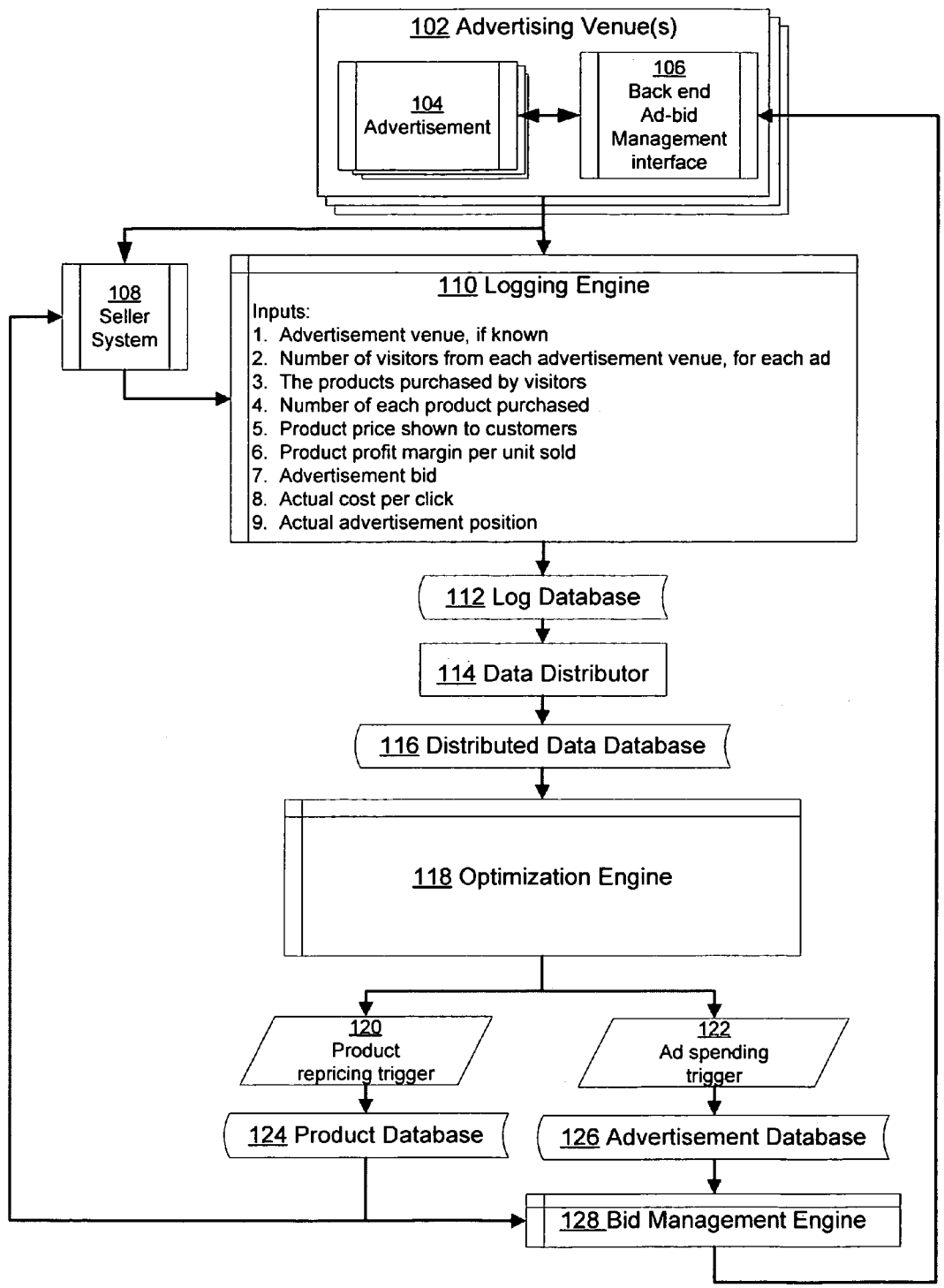
FIG. 1 illustrates an exemplary system for updating the prices of products at a seller's website to their profit-maximizing price while concurrently updating the seller's advertisement bids at one or multiple advertisement venues.

The system shown in FIG. 1 is an exemplary embodiment of the present invention. Specifically, FIG. 1 illustrates an advertising venue 102 with an advertisement 104 and a back end advertisement management interface 106. The advertising venue 102 may refer to any system or provider that offers the seller an avenue to advertise. Consumers are exposed to advertisements through the advertising venue 102. The advertisement 104 on the advertising venue 102 is purchased by a seller according to a bidding system, such as the CPC or CPI systems described above. Although the description herein may at times refer to a single advertisement 104, it is understood that the exemplary system may employ more than one advertisement 104 at the advertising venue 102. The back end advertisement management interface 106 may be a software application which adds, deletes, or updates the seller's advertisement bids at the advertising venue 102 based upon the data it receives from the bid management engine 128. The back end advertisement management interface 106 may also be used to manage other aspects of advertising through advertisement venue 102.

The advertisement 104 presents marketing or promotional information about a seller or a seller's products to consumers. The advertisement 104 may include, but is not limited to, an advertisement on the Internet, television, radio, printed publication, or public display. The advertisement 104 may present text, pictures, graphics, or any form of information about a seller or a seller's products. Thus, the advertisement 104 may include marketing information and hyperlinks to a seller venue 108 that are presented by an Internet search engine, or other medium, where consumer can search for or be exposed to advertisements associated with one or more keywords.

A product database 124 stores the marketing information about a seller or a seller's products, and the back end advertisement management interface 106 may provide, in certain cases, this stored information to the advertisement 104. The product information may include data such as: product name, product description, product weight and dimensions, manufacturer or model numbers, as well as keywords that can be associated with the product in search engines.

The seller employs a seller venue 108 where consumers are able to obtain detailed information about the seller and the seller's products. The seller venue 108 may also process sales transactions with consumers. By way of example, the seller venue 108 may be an Internet website that presents product information and accepts orders for products. If the advertisement 104 of advertising venue 102 is an advertisement on the Internet, such as an entry in a search engine listing, consumers who click on a hyperlink available through the advertisement 104, are directed to the seller venue 108. On the other hand, if the advertisement 104 is a non-Internet advertisement, such as a radio or television advertisement, consumers must access the seller venue 108 through a manual process, without the aid of a hyperlink. The pricing information for each product listed for sale on the seller venue 108 is transmitted from the product database 124.

As indicated previously, the seller venue 108 and/or the advertising venue 104 may be accessible through an electronic network. As such, one or more interface mechanisms can be used to access the seller venue 108 and/or the advertising venue 102, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

When the seller venue 108 and the advertisement 104 are accessible on the Internet, every advertisement 104 has a Uniform Resource Locator (URL), which is the exact web address of a site on the Internet. In addition, the URL for the advertisement 104 contains an embedded tracking code. When a consumer uses a hyperlink on the advertisement 104 to access the seller venue 108, the seller is able to determine that the consumer accessed the seller venue 108 through the advertisement 104 because the tracking code information is transmitted to a logging engine 110 which logs this tracking data.

Although the seller venue 108 may be accessible through the Internet, a seller may also choose to employ one or multiple non-Internet advertisements, separate from, or in conjunction with, an Internet advertisement. The seller venue 108 is not accessed via hyperlink, and correspondingly the non-Internet advertisements do not have their own URL's with embedded tracking codes which are automatically transmitted with use of a hyperlink. However, each non-Internet advertisement can give consumers a URL to access the seller venue 108 that is unique to the particular non-Internet advertisement. All such unique URL's direct consumers to the same seller venue 108 but have an embedded code which uniquely identifies the non-Internet advertisement that led to a consumer's visit to the seller venue 108. The logging engine 110 records the data identifying the non-Internet advertisement.

In addition to storing data that associates each consumer with a specific advertisement, the logging engine 110 stores other data on consumer activity associated with the advertising venue 102 in a log database 112. In particular, for each advertising venue and for each individual advertisement, this data may include, but is not limited to: the advertising venue and advertisement, the number of consumers directed by the advertising venue to the seller's site, the products purchased by directed consumers, the number of units of each product purchased by directed consumers, the product price shown to consumers, the product profit margin per unit sold, the seller's bid at the advertising venue, the amount of money the seller was charged per click at the advertising venue, and, in the case of certain Internet advertising systems, the ranking of the seller's advertisement at the advertising venue.

The information sent to the logging engine 110 is stored in a log database 112. With respect to the databases described herein, the devices and subsystems of the exemplary embodiments can store information relating to various processes and data described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

It is possible that the seller venue 108 may not be able to determine the advertisement that led to a consumer's visit to the seller venue 108. Such a situation may occur when there is an error in the transmission of data identifying the advertisement, or when the consumer accesses the seller venue 108 without the aid of an advertisement. Although an advertisement cannot be associated with a customer's visit, data regarding the untraceable customer's visit is still important in sales and profitability analysis, as untraceable customers account for a percentage of the seller's total sales. Accordingly, as shown in the exemplary embodiment of FIG. 1, a data distributor 114 is designed to automatically distribute data from untraceable customers in pro-rata fashion to the data from traceable customers, so that all sales are accounted for and associated with an advertisement.

More specifically, as detailed by the tables in FIG. 3 the system uses the data distributor 114, which may be a software application, to determine and account for the total number of units purchased by consumers who cannot be associated with a particular directing advertisement. In general, the data distributor 114 distributes the sales data from such consumers across the sales data that is attributed to each advertisement. While the example outlined in FIG. 3 is illustrative of a method of distributing data based upon the pro-rating of units sold, it should be noted that the system is also capable of distributing the data by pro-rating the sales-dollar amounts or profit margins. Moreover, the distribution may also employ other distribution techniques, such as weighting factors to bias the data toward a particular type of advertisement, rather than employing a straight pro-rata approach.

Referring now to FIG. 3, data set 302 contains information gathered about consumers whose visits to the seller's venue can be traced to a directing advertisement. Also shown in FIG. 3, the data set 304 contains information gathered about consumers whose visits to the seller's system cannot be traced to a particular advertisement.

The data set 302 contains five scenarios, 308, 310, 312, 314 and 316, each of which represent the data collected from consumer activity at the seller's venue which can be traced to advertisements from five independent advertisement venues. The seller advertises through the advertisements for a specified period of time, such as one day. Additionally, for each of the scenarios in data set 302, the data is separated into ten categories including the product sales price A, the direct product costs B, the margin per unit C, the maximum advertisement bid D, the average actual cost per click E, the generated traffic F, the quantity sold G, the percent quantity sold H, the margin dollars I, the advertisement cost J, and lastly the margin after advertisement costs K.

The data set 304 contains the scenario 318, which represents the data collected about consumer activity at a seller's system, for all consumers who were directed to the seller's system by an unknown advertisement. Additionally, for the scenario illustrated in data set 304, the data is also separated into the same ten categories as data set 302. However, it should be noted that because the information in the data set 304 is about consumers with unknown directing advertisements, there will be no information regarding the maximum advertisement bid D, the average actual cost per click E, the advertisement cost J nor the margin after advertisement cost K.

Data distributor 114 determines that in data set 302, the seller sold a total of 71 units to customers with known advertisement venues, by adding together the quantity sold G, for each scenario. The data distributor 114 also calculates that in data set 304 the seller sold 18 units to customers with unknown directing advertisements.

Data distributor 114 then determines, for each scenario in data set 302, the percentage of quantity sold H that each scenario accounts for, out of the 71 total units sold to consumers with known directing advertisements.

Data distributor 114 then determines the proportion of the percentage of the total quantity sold to consumers with unknown directing advertisements in data set 304, by multiplying the total quantity sold in data set 304, 18 units, by the percentage of total quantity sold H for each scenario in data set 302.

Once the system has finished calculating both the percentage of quantity sold H for each scenario in data set 302 and the proportion of the percentage of total quantity sold to consumers with unknown directing advertisements in dataset 304, it creates the data set 306. The data set 306 illustrates the five scenarios contained in the data set 302, after the data about consumers with unknown directing advertisements contained in the data set 304 has been distributed proportional amongst them. Additionally, for each of the scenarios in data set 306, the data is separated into thirteen categories including the product sale price AA, the direct product costs BB, the margin per unit CC, the maximum advertisement bid DD, the average actual cost per click EE, the generated traffic FF, the quantity sold GG, the percentage of quantity sold HH, the total quantity sold II, margin dollars JJ, advertisement costs KK and lastly the margin (after advertisement costs) LL.

The data set 306 adds the quantity sold GG, as gathered from the data set 302, to the percentage of quantity sold from 304 together to determine the total quantity sold II. This process is completed for each scenario in the system. Now that the system has distributed the data gathered about consumers with unknown directing advertisement venues, it is able to recalculate margin and margin after advertising cost, as illustrated in the data set 306 by margin dollars JJ and margin (after advertising cost) LL.

The data distributor 114 processes the data it receives from the log database 112, which contains all of the data gathered by the logging engine 110. The logging engine 110 collects data on consumer activity generated by the advertising venue 102. The logging engine 110 also collects data on the seller's bidding at the advertising venue 102.

All of the data contained in the log database 112 and modified by the data distributor 114 is stored in the distributed data database 116, and can either be transmitted to the optimization engine 118 manually or at programmable intervals.

As stated above, the devices and subsystems of the exemplary embodiments can include computer readable media or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Returning to the embodiment of FIG. 1, the optimization engine 118 is a software application that processes data contained in the distributed data database 116 in order to determine the optimal profit maximizing price for each product, and the optimal advertisement bid at each advertisement venue for each advertisement. However, in order to do this the optimization engine 118 first makes calculations, using the data transmitted from the distributed data database 116, regarding various data including conversion rates, advertisement cost, and profit margins.

As mentioned earlier the conversion rate is the percentage of visitors to a seller's system that actually make purchases. Using the data transmitted from the distributed data database 116, the optimization engine 118 determines the conversion rates for each advertisement employed by the seller by dividing the total number of purchases made by visitors from each advertisement by the number of visitors generated by that specific advertisement.

The optimization engine 118 then proceeds to calculate the profit margin, after advertisement costs, for each advertisement, at each advertisement venue the seller is employing. To do this, the optimization engine 118 determines the margin per unit for each individual product based on a specific product price, the total margin before advertisement costs for each individual advertisement in a specific scenario, and the advertisement's cost for each scenario.

The optimization engine 118 first calculates the margin per unit by subtracting the direct product costs which include wholesale cost, freight expense and any associated handling costs, from the actual sale price of the product. The optimization engine calculates the total margin before advertisement costs for each advertisement, at each venue, by taking all relevant orders and subtracting from the total sales amount all of the actual direct products costs.

Next, the optimization engine 118 determines the advertising cost for each scenario. In the case of a CPC system the advertising expense for each scenario is the summation of the cost-per-click charges accrued for the advertisement at each advertising venue during the time period defined by the scenario. A scenario refers to an advertisement being employed at a specific advertisement bid amount, at a specific advertisement venue, being employed over a specified time span. Finally, to determine the profit margin, after advertisement costs, for each scenario, the optimization engine 118 subtracts the advertisement's costs from the margin dollars before advertisement costs. The combination of scenarios with the largest total profit margin indicates the optimal combination of product price and advertising bids. This process is further detailed below in the discussion of FIG. 2.

The optimization engine 118 determines both the optimal price and the optimal advertising bid from the data it processes. Thus, the optimal combination of price and advertising bids determined by the optimization engine 118 depends on the data gathered. The optimization engine 118 constantly receives data about each price point from the distributed data database 116. The amount of data available to the optimization engine 118 increases with the number of combinations that are actually implemented. Accordingly, a dynamic approach may be employed where the optimal product price and advertising bids are adjusted as more data is gathered. In addition to taking into account any changes in the effectiveness of the advertisements, this continuous adjustment factors in changes in the overall market that impact demand.

Moreover, an iterative process may be used to search for the optimal product price and advertising bids by evaluating a series of product price updates where the product is advertised with advertisements at a particular set of advertising bids. The optimization engine 118 controls the product repricing trigger 120 to iteratively update and evaluate a plurality of price points, for a constant set of advertisement bids constant. The logging engine 110 collects information regarding each price point. The optimization engine 118 finds the most profitable price point among the implemented price points and creates new price points according to this most optimal price point. These new price points are then implemented to collect more data. This search continues until it narrows to the optimal, profit-maximizing price for the particular set of advertising bids. This iterative approach can be used for each of a plurality of sets of advertising bids to identify the optimal combination of product price and advertising bids. In this way, the space mapping the relationship between product price and advertising bids can be determined.

Figure 4:
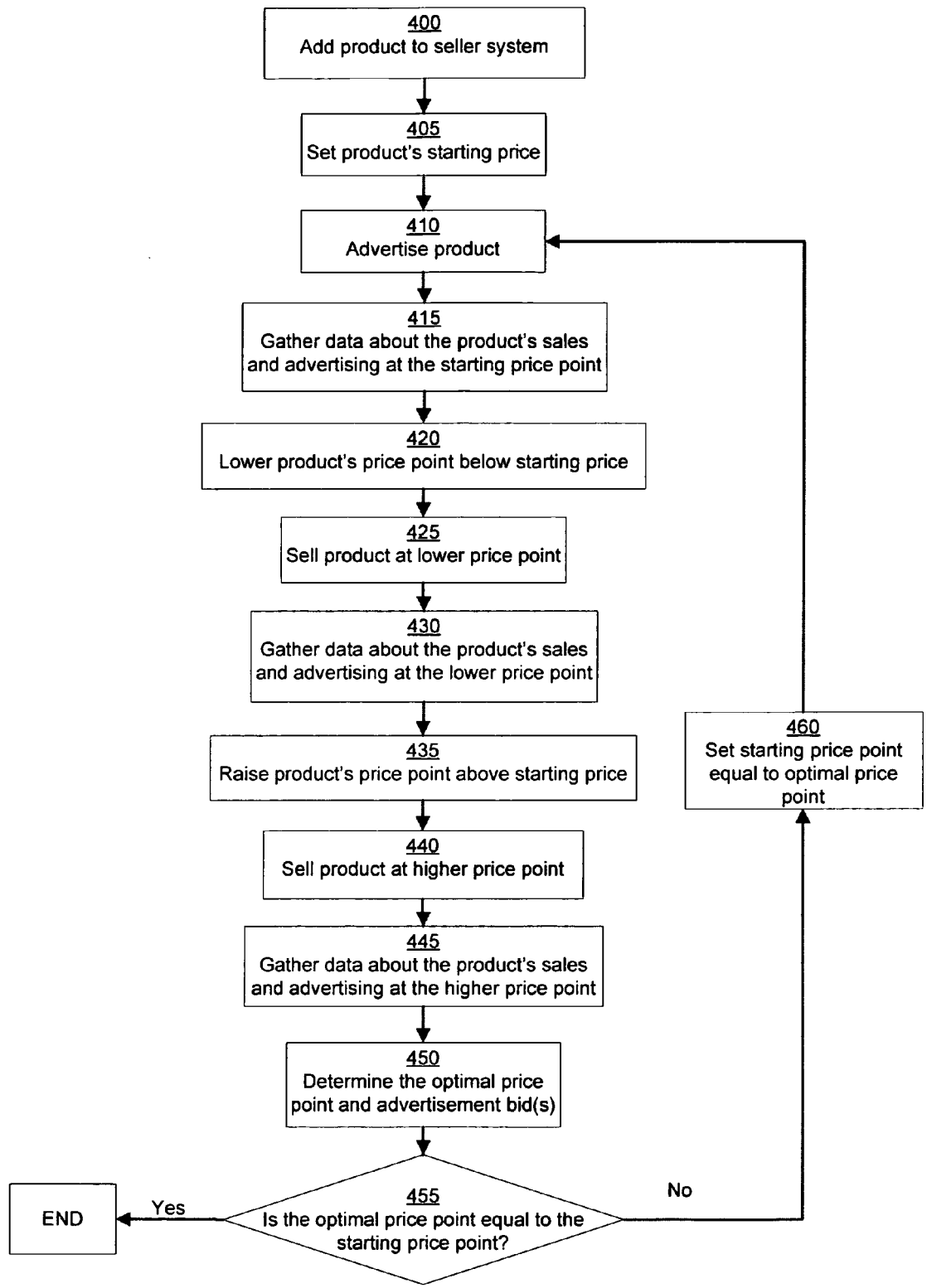
FIG. 4 illustrates an embodiment of the present invention that employs an iterative approach to determine the optimal product price for a particular combination of advertising bids submitted to at least one advertising venue.

FIG. 4 illustrates a simple version of this iterative process. Before a seller can sell and advertise a product in step 410, the seller sets a starting price point, or product price, in step 405, for a particular set of advertising bids. After collecting data, in step 415, from the sale and advertising of the product at the starting price point and particular advertisement bids over a collection period, a lower price point is set for the sale of the product, as illustrated in step 420. The lower price point is lower than the starting price point, but should be high enough to provide a positive marginal profit. This lower price point can be systematically determined by reducing the starting price point by a certain percentage while ensuring a positive profit margin. As shown in step 425, the product is sold at this lower price point for a new collection period with the same advertising bids. Correspondingly, in step 430, data is also collected regarding the sale and advertising at the lower price point. Once the collection period is over, a new higher price point is set for the sale of the product, as illustrated in step 435. This higher price point is higher than the starting price point, and can be systematically determined by increasing the starting price point by a certain percentage. Similar to the previous price points, the product is sold at the higher price point with the same advertising bids over a collection period, and corresponding data is collected, as shown in steps 440 and 445. Once the data is collected from the implementation of all price points, the optimization engine 118 in step 450 is able to select the most profitable of these price points and the corresponding advertisement bid or bid, for each advertisement venue. In step 455, the most profitable price point is checked against the starting price point. If the most profitable price point is equal to the starting price point, the optimal price point is identified. If, however, the most profitable price point is not equal to the starting price point, the most profitable price point is set as a new starting point in step 460. New lower and higher price points are created using the new starting point. The steps 405 through 455 are repeated until a new starting point cannot be created, i.e. the starting price point is determined to be the most profitable.

Conversely, in another embodiment, the product price can be kept constant as optimal advertising bids are determined at the particular product price by iteratively evaluating a series of advertising bids, i.e. a starting bid, a lower bid, and a higher bid, for each advertisement. The optimal advertising bids can than be found for a plurality of product prices. Nevertheless, both iterative approaches allow the landscape of product prices and advertising bids to be mapped.

With the iterative approaches described hereinabove, it is understood that the set of advertising bids does not necessarily mean that the same bid is being employed for all advertisements across all advertising venues. In practice, the seller is likely to employ different bid levels for different advertisements, even for advertisements with the same advertising venue. It is further understood that even if the iterative approach does determine an optimal price point or an optimal combination of advertising bids for a plurality of advertisements, the optimal product price and the optimal advertising bids are not likely to remain static, because the market is dynamic. As such, the seller may have to re-execute the iterative technique again in order to track changes in the market that may affect the optimal product price or advertising bids. Moreover, even if step 450, as shown in FIG. 4, finds that the profit-maximizing price is not equal to the starting point, the process does not have to move immediately to step 455, and evaluation of a new starting point, equal to the determined profit-maximizing price, can be executed at a later time. Furthermore, although the collection periods are preferably equal to facilitate analysis of the data, the data collected can be normalized if the collection periods are not equal.

Referring back to FIG. 1, the optimization engine 118 uses the repricing trigger 120 to update the prices in the product database 124, while simultaneously using an advertisement spending trigger 122 to update the maximum advertising bid in advertisement database 126. The product repricing trigger 118 and the advertisement spending trigger 122 are each run by software that monitors the system and checks the optimization engine 118 for updates at specific, programmable amounts of time.

The updated product prices stored in product database 124 are transmitted on a scheduled basis to the seller venue 108, where they are presented to consumers as well as to the bid management engine 128. The updated advertisement bid information and the updated product price information is used by bid management engine 128 to update advertising information at the back-end advertisement management interface 106, which adds, edits or deletes the advertisements and updates the seller's maximum advertisement bids at advertising venue 102. A exemplary embodiment of the system is designed to use an application programming interface, which allows data exchange between the bid management engine 128 and the advertising venues 102, to update the seller's maximum advertisement bid. These bids may, however, be updated manually by using an interface provided by the advertising venue.

FIG. 2 shows a table, which contains the type of data that is stored in the distributed data database 116 and used by the optimization engine 118 to determine the optimal profit maximizing product price and optimal advertisement bids.

The table in FIG. 2 contains data, collected at three separate price points of $80, $90 and $100. Each of the three price points is tested at two separate and independent advertising venues that employ bidding systems, advertisement venue 202 and advertisement venue 204. In this example, only one advertisement is run at each of the two advertising venues. Returning to FIG. 1, the advertisement venues 202 and 204 correspond with the advertisement venue 102, and are illustrative of the types of advertisement venues a seller can employ.

It is understood that the example of FIG. 2 is merely a simplified demonstration, and that the present invention is applicable to situations where a product is marketed through multiple advertising venues, each with multiple advertisements for the product. Moreover, there is not necessarily a 1:N relationship between the product and advertisements. In other words, a single advertisement may be used to market more than one product. Regardless, the present invention tracks activity and logs data for each product attributable to the single advertisement.

Generally, the seller employs more than one advertisement at each advertising venue. FIG. 2 provides an example in which the seller is employing only one advertisement at each advertising venue. However, in terms of complexity, the example is akin to employing two separate advertisements at one advertisement venue, e.g. advertisement 202 and advertisement 204 would be available through the same advertising venue. Each of these circumstances is processed in the same way.

At the advertising venue 202, the bids tested are $0.15, $0.20 and $0.35. At the advertising venue 204, the bids tested are $0.20 and $0.40. Each bid is tested at three different price points. In addition, each bid at the advertising venue 202 is tested with each bid at advertising venue 204, and vice versa. Thus, a total of 18 independent scenarios are created, with each scenario using the averages of the data collected over the course of one week.

Data is gathered at two separate and non-linear advertisement venues 202 and 204, regarding each of the scenarios 206, 208, 210, 212, 214, 216, 218, 220, 222, 224, 226, 228, 230, 232, 234, 236, 238 and 240. Additionally, the data for each of the scenarios is separated into 20 categories, including the product sales price A, the direct product costs B, the margin per unit C which are the same at both the advertisement venue 202 and the advertisement venue 204.

The data regarding the scenarios behavior at the advertisement venue 202 and the advertisement venue 204 is further divided into the maximum advertisement bid D, the average actual cost per click E, the generated traffic F, the conversion rate G, the quantity sold H, the margin dollars I, the advertisement cost J, and the margin after advertisement costs K.

Lastly, the final data category in FIG. 2 is the total margin (after advertisement cost) L, which combines the margin (after advertisement cost) K from both the advertisement venue 202 and the advertisement venue 204.

Referring back to the exemplary embodiment, each of the scenarios outlined in FIG. 2 are representative of the advertisement 104 for their respective advertisement venues 202 and 204. Furthermore the data in FIG. 2 regarding each of the aforementioned scenarios respective gross and per unit margins, advertisement bids, actual advertising costs, generated web traffic, conversion rate, quantity demanded, and resulted margin dollars are all illustrative of the type of data that is collected by the logging engine 110, normalized by the data distributor 114, stored in the distributed data database 116 and modified by the optimization engine 118.

As illustrated by the scenario 216 and the scenarios 236, in the advertisement venue 202 a non-linear relationship exists between advertising expenditures and resulting margin dollars. In the scenario 216 the advertisement costs J is $300 which results in $150 in margin dollars I. If the relationships between advertising expenditures and margin dollars were linear, meaning a proportional relationship existed between the two variables; one could expect that if the seller were to spend only $100 on advertising, the resulted margin dollars would be one third of margin dollars generated when $300 is spent on advertisement, or $50. However as illustrated by the scenario 234 the seller's advertisement cost J is $100 which results in $150 margin dollars I.

As illustrated in the advertisement venue 202, there is an inverse relationship between product price and conversion rates. Generally speaking, as price increases, conversion rates decrease. However, as illustrated by price point 226, even though it does not have the highest conversion rate G, when advertisement costs are taken into account, it becomes clear that actualized margin, which is margin after advertisement costs K, for price point 226 is $62 dollars greater than price points 206-216, in advertisement venue 202, where the conversion rate G is highest. While there is commonly an inverse relationship between product price and conversion rates, it is possible, though unlikely, that there could also be a direct relationship between the two variables.

Scenario 226 is illustrative of the fact, that the price point alone is not a wholly effective method of determining the optimal profit maximizing price. In scenario 226 while looking only at advertising venue 202, there is a price point of $90, and a resulting margin after advertisement costs K of $75, yet this is not the case for scenarios 218, 220, 222, 224, each of those four scenarios share the price point of $90, however they all have margins after advertisement costs K, below $75, partially based on the fact that they have advertisement bids other than $0.35.

The data gathered about scenario 226 in advertisement venue 202 is illustrative of the fact that a seller cannot find the optimal profit maximizing price while only changing the price point. However, because this scenario is taking place at two separate and independent advertisement venues, simultaneously, this is not the case when scenario 226 is considered in its entirety.

Scenarios 226 and 228 are also exemplary of the fact that determining the optimal profit maximizing price is a dynamic process that is constantly monitored in order to ensure that a web seller is, in fact, advertising their product at the optimal price. When looking solely at the results of advertising venue 202, scenarios 226 and 228 both share the same price point of $90, and both were tested at a bid of $0.35; however scenario 226 has a margin after advertisement cost K of $75, while scenario 228, which represents data collected the following week, only has an margin after advertisement costs K of $60.

As the data in FIG. 2 demonstrates, if this product were being advertised solely at advertisement venue 202, the system would determine that the optimal profit maximizing scenario would be scenario 226, which has a profit maximizing price of $90. In order to achieve the quantity sold (demanded) H of 25 that results in a margin after advertisement cost K, of $75, the bid is $0.35 per click.

However, because the seller is advertising this product at both advertisement venue 202 and advertisement venue 204, and the seller can only advertise and sell a product at one price at any given time, the system needs to determine which price point produces the greatest total margin, after advertisement cost, when the margin after advertisement cost K in advertisement venue 202 is added to the margin after advertisement cost K in advertisement venue 204. This is illustrated by price point 236.

While price point 236 has one of the lower conversion rates G in the advertisement venue 202, and only an average conversion rate G in the advertisement venue 204, it is still the optimal price point because the total margin, after advertisement costs L is $175.

Returning to FIG. 1, once the optimization engine 118 determines that the optimal price point is $100, it employs the product trigger 120 to update the price for the product in the product database 124, which in turn updates the price being advertised in the advertisement 104.

The optimization engine 118 also employs the advertisement spending trigger 122 to update the advertisement database 126 so that it contained the correct combination of profit maximizing advertisement bids associated with the optimal price point. In the case of FIG. 2, this means that the optimization engine 118 changes the seller's maximum advertisement bid D to $0.20 for the advertisement running at advertisement venue 202 and the maximum advertisement bid D to $0.40 for the advertisement running at advertisement venue 204.

The number of scenarios, and time frames detailed in this example are by way of example, and it should be noted that the system is capable of updating pricing and advertisement bids using any number of scenarios and time spans. It should also be noted that the examples illustrated in FIG. 1, FIG. 2 and FIG. 3 may seem simplistic, however there is a scalability factor that must be addressed. When applying the exemplary embodiment to a real world setting the calculations are made infinitely more complex when a seller employs a marketing strategy that implements a variety of independent and varied advertisements at a number of independent and varied advertisement venues and uses multiple advertisement bids for the various advertisements at the various advertisement venues; and in addition tests numerous price points for each their products.

It is to be understood that the devices and subsystems of the exemplary embodiments are for exemplary purposes. All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as is appreciated by those skilled in the computer and software arts. Appropriate software can be readily prepared by programmers of ordinary skill based on the teachings of the exemplary embodiments, as is appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

While the present inventions have been described in connection with a number of exemplary embodiments, and implementations, the present inventions are not so limited, but rather cover various modifications, and equivalent arrangements, which fall within the purview of prospective claims.

What is claimed is:

1. A computer-implemented method for maximizing profits from the sale of a product by a seller to consumers through a seller venue, the product being advertised with at least one advertisement through at least one advertising venue, the method comprising:
   identifying, via one or more processors, a plurality of differing sales prices;
   submitting, via the one or more processors, a plurality of differing bid prices to the at least one advertising venue, each of said plurality of differing bid prices being at corresponding ones of said plurality of differing sales prices, such that each of said plurality of differing bid prices facilitates buying the at least one advertisement through the at least one advertising venue;
   collecting, via one or more processors, data, said data comprising advertising data associated with each of said plurality of differing bid prices from advertising with the at least one advertisement and sales transaction data processed through the seller venue when selling the product at each of the plurality of differing sale prices and at each of the plurality of differing bid prices, such that said sales transaction data includes a combination of bid prices associated with the at least one advertisement at each of the plurality of sale prices;
   determining, via the one or more processors, from the collected data, a non-linear model, said non-linear model being based at least in part upon an interdependence between each of the plurality of differing sale prices and each of the plurality of differing bid prices; and
   determining, via the one or more processors and based at least in part upon said non-linear model, an interrelated optimal price for the product and optimal advertising bid for the at least one advertisement, said determination comprising an iterative process, whereby successive ones of each of said plurality of differing bid prices and successive ones of each of said plurality of differing sale prices are jointly and concurrently selected until a combined selection thereof operates to maximize total profit for the product.

2. The computer-implemented method according to claim 1, wherein collecting data from advertising with each of the at least one advertisement comprises collecting, for each combination of bid prices for the at least one advertisement, at each of the plurality of sale prices: a total number of consumers exposed to each of the at least one advertisement, a subset number of consumers purchasing the product after being exposed to each of the at least one advertisement, and an actual cost per consumer exposure for each of the at least one advertisement.

3. The computer-implemented method according to claim 2, wherein determining a non-linear model for pricing and bidding comprises, for each combination of bid prices for the at least one advertisement, at each of the plurality of sale prices:
   determining, via the one or more processors, a direct non-advertisement cost per unit of the product, the direct non-advertisement cost excluding the cost of advertising at the at least one advertisement;
   determining, via the one or more processors, a margin per unit for the product by subtracting the direct non-advertisement cost per unit from the sale price;
   determining, for each of the at least one advertisement venue, a first total profit for all products purchased, excluding advertisement costs, by multiplying the margin per unit with the subset number of consumers purchasing the product;
   determining, for each of the at least one advertisement venue, a total advertising cost, by multiplying the total number of consumers exposed with the actual cost per consumer exposure;
   determining, for each of the at least one advertisement venue, a second total profit accounting for advertisement costs, by subtracting the total advertising cost from the first total profit; and
   determining, via the one or more processors, the combination total profit for all of the at least one advertisement venue by aggregating the second total profits from each of the at least one advertisement venue.

4. The computer-implemented method according to claim 1, wherein collecting data from advertising with the at least one advertisement comprises collecting data on activity by traceable consumers, the traceable consumers being associated with exposure to the at least one advertisement.

5. The computer-implemented method according to claim 4, wherein the traceable consumers are associated with exposure to the at least one advertisement through a tracking number.

6. The computer-implemented method according to claim 5, further comprising collecting data activity by untraceable consumers, the untraceable consumers being unassociated with exposure to the at least one advertisement.

7. The computer-implemented method according to claim 6, further comprising aggregating the data collected for the untraceable consumers with the data collected for the traceable consumers.

8. The computer-implemented method according to claim 7, wherein the aggregated data includes at least one of: units sold, sales volume, and profit margins.

9. The computer-implemented method according to claim 7, wherein aggregating the data collected for the untraceable consumers to the data collected for the traceable consumers comprises:
   determining, via the one or more processors, a total number of traceable consumers from all of the at least one advertisement;
   determining, via the one or more processors, a respective per-advertisement number of traceable consumers for each of the at least one advertisement, the respective per-advertisement number corresponding to traceable consumers presented with the respective advertisement;

determining, via the one or more processors, a respective distribution factor for each of the at least one advertisement by dividing the respective per-advertisement number by the total number of traceable consumers;

determining, via the one or more processors, a respective distributed data for each of the at least one advertisement by multiplying the data collected for the untraceable consumers by the respective distribution factor; and including the respective distributed data for each of the at least one advertisement with the data collected for the traceable consumers for each of the at least one advertisement.

10. The computer-implemented method according to claim 1, wherein the at least one advertising venue sells the at least one advertisement to a highest bidder.

11. The computer-implemented method according to claim 1, wherein the at least one advertising venue sells the at least one advertisement according to at least one bid in a bidding system charging on a cost per impression (CPI) basis.

12. The computer-implemented method according to claim 10, wherein the seller buys the at least one advertisement according to at least one bid in a straight-auction bidding system.

13. The computer-implemented method according to claim 10, wherein the seller buys the at least one advertisement according to at least one bid in a blind-bid system.

14. The computer-implemented method according to claim 1, wherein the at least one advertising venue accepts more than one prospective bids and the at least one advertisement is presented with a frequency according to a comparison of the seller's bid to the more than one prospective bids.

15. The computer-implemented method according to claim 1, wherein the at least one advertising venue accepts a plurality of prospective bids and the at least one advertisement is presented with a prominence according to a comparison of the seller's bid to the plurality of prospective bids.

16. The computer-implemented method according to claim 1, wherein the product is associated with at least one keyword and the at least one advertising venue presents the at least one advertisement as an entry in a listing associated with the at least one keyword.

17. The computer-implemented method according to claim 16, wherein the at least one advertising venue accepts a plurality of prospective bids for the at least one keyword and the at least one advertising venue presents the entry in the listing according to a comparison of the seller's bid to the plurality of prospective bids.

18. The computer-implemented method according to claim 1, further comprising updating a product database with the optimal price for the product.

19. The computer-implemented method according to claim 1, further comprising submitting updated bids to the at least one advertising venue.

20. The computer-implemented method according to claim 1, further comprising storing the collected data in a database.

21. The computer-implemented method according to claim 1, wherein the at least one advertising venue presents the at least one advertisement over an electronic network.

22. The computer-implemented method according to claim 21, wherein the at least one advertisement directs consumers over the electronic network to the seller's venue.

23. A system for maximizing profits from the sale of a product by a seller to consumers through a seller venue, the product being advertised with at least one advertisement directing consumers to the seller venue provided by at least one advertising venue, the system comprising one or more memory storage areas and one or more processors, the one or more processors configured to:

execute a logging engine configured to:
identify a plurality of differing sales prices;
submit a plurality of differing bid prices to the at least one advertising venue, each of said plurality of differing bid prices being at corresponding ones of said plurality of differing sales prices, such that each of said plurality of differing bid prices facilitates buying the at least one advertisement through the at least one advertising venue; and
collect, data, said data comprising advertising data associated with each of said plurality of differing bid prices from advertising with the at least one advertisement and sales transaction data processed through the seller venue when selling the product at each of the plurality of differing sale prices and at each of the plurality of differing bid prices, such that said sales transaction data includes a combination of bid prices associated with the at least one advertisement at each of the plurality of sale prices; and execute an optimization engine configured to:
determine, from the collected data, a non-linear model, said non-linear model being based at least in part upon an interdependence between each of the plurality of differing sale prices and each of the plurality of differing bid prices; and
determine, from the non-linear model, an interrelated optimal price for the product and optimal advertising bid for the at least one advertisement, said determination comprising an iterative process, whereby successive ones of each of said plurality of differing bid prices and successive ones of each of said plurality of differing sale prices are jointly and concurrently selected until a combined selection thereof operates to maximize total profit for the product.

24. The system according to claim 23, wherein, to collect data from advertising with each of the at least one advertisement, the logging engine is configured to collect, for each combination of bid prices for each of the at least one advertisement, at each of the plurality of sale prices: a total number of consumers exposed to each of the at least one advertisement, a subset number of consumers purchasing the product after being exposed to each of the at least one advertisement, and an actual cost per consumer exposure for each of the at least one advertisement.

25. The system according to claim 24, wherein, to determine a non-linear model for pricing and bidding, the optimization engine, for each combination of bid prices for each of the at least one advertisement, at each of the plurality of sale prices is configured to:

determine a direct non-advertisement cost per unit of the product, the direct non-advertisement cost excluding the cost of advertising at the at least one advertisement,
determine a margin per unit for the product by subtracting the direct non-advertisement cost per unit from the sale price,
determine, for each of the at least one advertisement venue, a first total profit for all products purchased, excluding advertisement costs, by multiplying the margin per unit with the subset number of consumers purchasing the product,
determine, for each of the at least one advertisement venue, a total advertising cost, by multiplying the total number of consumers exposed with the actual cost per consumer exposure, determine, for each of the at least one advertisement venue, a second total profit accounting for advertisement costs, by subtracting the total advertising cost from the first total profit, and determine the combination total profit for all of the at least one advertisement venue by aggregating the second total profits from each of the at least one advertisement venue.

26. The system according to claim 23, wherein, to collect data from advertising with each of the at least one advertisement, the logging engine is configured to collect data on activity by traceable consumers, the traceable consumers being associated with exposure to the at least one advertisement.

27. The system according to claim 26, wherein the traceable consumers are associated with exposure to the at least one advertisement through a tracking code.

28. The system according to claim 26, wherein the logging engine is further configured to collect data on activity by untraceable consumers, the untraceable consumers being unassociated with exposure to the at least one advertisement.

29. The system according to claim 28, further comprising a data distributor configured to aggregate the data collected for the untraceable consumers with the data collected for the traceable consumers.

30. The system according to claim 29, wherein the aggregated data includes at least one of: units sold, sales volume, and profit margins.

31. The system according to claim 29, wherein, to aggregate the data collected for the untraceable consumers with the data collected for the traceable consumers, the data distributor is further configured to:

determine a total number of traceable consumers from all of the at least one advertisement, determine a respective per-advertisement number of traceable consumers for each of the at least one advertisement, the respective per-advertisement number corresponding to traceable consumers presented with the respective advertisement, determine a respective distribution factor for each of the at least one advertisement by dividing the respective per-advertisement number by the total number of traceable consumers, determine a respective distributed data for each of the at least one advertisement by multiplying the data collected for the untraceable consumers by the respective distribution factor, and include the respective distributed data for each of the at least one advertisement with the data collected for the traceable consumers for each of the at least one advertisement.

32. The system according to claim 23, wherein the at least one advertising venue sells the at least one advertisement to a highest bidder.

33. The system according to claim 23, wherein the at least one advertising venue sells the at least one advertisement according to at least one bid in a bidding system charging on a cost per impression (CPI) basis.

34. The system according to claim 23, wherein the seller buys the at least one advertisement according to at least one bid in a straight-auction bidding system.

35. The system according to claim 23, wherein the seller buys the at least one advertisement according to at least one bid in a blind-bid system.

36. The system according to claim 23, wherein the at least one advertising venue accepts a plurality of prospective bids and the at least one advertisement is presented to consumers with a frequency according to a comparison of the seller's bid to the more than one prospective bids.

37. The system according to claim 23, wherein the at least one advertising venue accepts a plurality of prospective bids and the at least one advertisement is presented with a prominence according to a comparison of the seller's bid to the plurality of prospective bids.

38. The system according to claim 23, wherein the product is associated with at least one keyword and the at least one advertising venue presents the at least one advertisement as an entry in a listing associated with the at least one keyword.

39. The system according to claim 38, wherein the at least one advertising venue accepts a plurality of prospective bids for the at least one keyword and the at least one advertising venue presents the entry in the listing according to a comparison of the seller's bid to the plurality of prospective bids.

40. The system according to claim 23, further comprising:
a product database with a current sale price for the product, the product database supplying the current sale price for the sale of the product by a seller to consumers; and
a product repricing trigger configured to update the product database with the optimal price for the product determined by the optimization engine.

41. The system according to claim 23, further comprising:
an advertisement database with the bid prices for buying the at least one advertisement;
an advertisement spending trigger configured to update the bid prices in the advertisement database; and
wherein the one or more processors are further configured to execute a bid management engine configured to submit the bid prices from the advertisement database to the at least one advertising venue.

42. The system according to claim 23, further comprising a log database configured to store the collected data.

43. The system according to claim 23, wherein the at least one advertising venue presents the at least one advertisement over an electronic network.

44. The system according to claim 43, wherein the at least one advertisement directs consumers over the electronic network to the seller's venue.

45. A computer program product for maximizing profits from the sale of a product by a seller to consumers at a product price, the product being advertised with an advertisement provided by an advertising venue, and the seller buying the advertisement by submitting a bid price to the advertising venue, the computer program product comprising at least one computer-readable storage medium having computer-readable program code portions stored therein, the computer-readable program code portions comprising:

an executable portion configured to:
identify a plurality of differing sales prices;
submit a plurality of differing bid prices to the at least one advertising venue, each of said plurality of differing bid prices being at corresponding ones of said plurality of differing sales prices, such that each of said plurality of differing bid prices facilitates buying the at least one advertisement through the at least one advertising venue; and
collect, data, said data comprising advertising data associated with each of said plurality of differing bid prices from advertising with the at least one advertisement and sales transaction data processed through the seller venue when selling the product at each of the plurality of differing sale prices and at each of the plurality of differing bid prices, such that said sales transaction data includes a combination of bid prices associated with the at least one advertisement at each of the plurality of sale prices; and an executable portion configured to determine, from the collected data, a non-linear model, said non-linear model being based at least in part upon an interdependence between each of the plurality of differing sale prices and each of the plurality of differing bid prices; and an executable portion configured to determine, from the non-linear model, an interrelated optimal price for the product and optimal advertising bid for the at least one advertisement, said determination comprising an iterative process, whereby successive ones of each of said plurality of differing bid prices and successive ones of each of said plurality of differing sale prices are jointly and concurrently selected until a combined selection thereof operates to maximize total profit for the product.

46. The computer program product according to claim 45, wherein collecting data from advertising with each of the at least one advertisement comprises collecting, for each combination of bid prices for the at least one advertisement, at each of the plurality of sale prices: a total number of consumers exposed to each of the at least one advertisement, a subset number of consumers purchasing the product after being exposed to each of the at least one advertisement, and an actual cost per consumer exposure for each of the at least one advertisement.

47. The computer program product according to claim 46, wherein the executable portion configured to determine a non-linear model for pricing and bidding is further configured to, for each combination of bid prices for the at least one advertisement, at each of the plurality of sale prices:

determine a direct non-advertisement cost per unit of the product, the direct non-advertisement cost excluding the cost of advertising at the at least one advertisement;

determine a margin per unit for the product by subtracting the direct non-advertisement cost per unit from the sale price;

determine, for each of the at least one advertisement venue, a first total profit for all products purchased, excluding advertisement costs, by multiplying the margin per unit with the subset number of consumers purchasing the product;

determine, for each of the at least one advertisement venue, a total advertising cost, by multiplying the total number of consumers exposed with the actual cost per consumer exposure;

determine, for each of the at least one advertisement venue, a second total profit accounting for advertisement costs, by subtracting the total advertising cost from the first total profit; and determine a combination total profit for all of the at least one advertisement venue by aggregating the second total profits from each of the at least one advertisement venue.

* * * * *